Oct. 17, 1961  V. G. M. CHATFIELD ET AL  3,004,553
COMBINED SHUT-OFF VENTILATED JET DISCHARGE VALVE
Filed Sept. 14, 1959  2 Sheets-Sheet 1

Inventors
V. G. M. CHATFIELD
F. KANGER

By Fetherstonhaugh & Co.
Attorneys

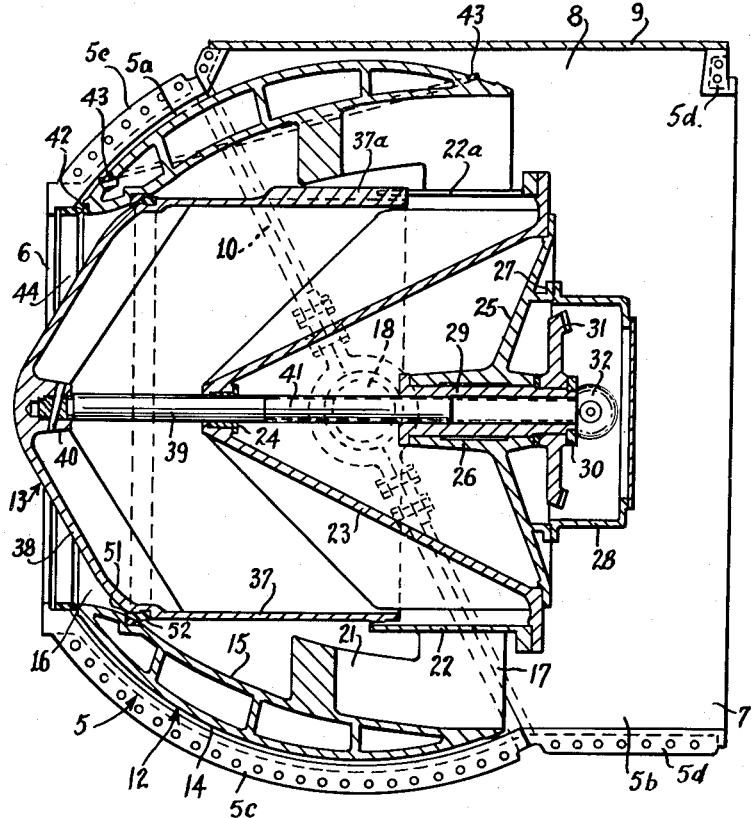
Fig. 2
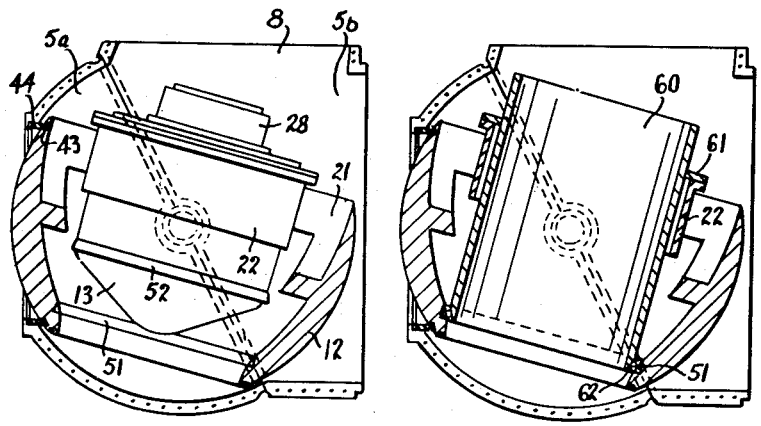
Fig. 3
Fig. 4
Inventors
V. G. M. CHATFIELD
F. KANGER
By Fetherstonhaugh & Co.
Attorneys 3,004,553
COMBINED SHUT-OFF VENTILATED JET DISCHARGE VALVE
Victor G. M. Chatfield, Verdun, Quebec, and Feodor Kanger, Cote St. Luc, Quebec, Canada, assignors to Dominion Engineering Works Limited, Montreal, Quebec, Canada
Filed Sept. 14, 1959, Ser. No. 839,928
Claims priority, application Canada Sept. 5, 1959
13 Claims. (Cl. 137—315)

This invention relates to free discharge valves and more particularly to a combination of a reciprocating main discharge flow control valve controlling the discharge of fluid under normal operating conditions and an oscillating valve or shut-off plug, sealing off the discharge of fluid to allow for maintenance and repair of the main reciprocating flow control valve.

The invention consists essentially of a trunnion supported valve assembly in which the oscillating valve or shut-off plug provides a support for the main discharge flow control valve, with the seat of the main discharge flow control valve being located on the inner surface of the oscillating valve structure. A movable sealing ring located at the inlet port of the valve seats against the oscillating valve in the open position of the oscillating valve to confine the discharge to flow through the oscillating valve and past the main discharge flow control valve when the latter is in the open position. When it is desired to shut-off the flow of fluid through the valve assembly in order to carry out maintenance or repair of the main discharge flow control valve, the movable sealing ring is withdrawn from sealing contact with the oscillating valve. The oscillating valve is then rotated through approximately 75° across the line of fluid discharge flow through the valve, blocking off the inlet port to the valve body and the movable sealing ring is then moved axially into sealing engagement with a second seat on the oscillating valve. In this position the main discharge flow control valve, on removal of the top cover of the valve body, can be dismantled and lifted up out of the valve body for maintenance and repair while the oscillating valve effectively shuts off the flow of fluid. The main discharge flow control valve can readily be replaced by a removable sleeve. This would allow the combined valve to be installed in a hydro-electric development initially as a free discharge valve. At a later date the free discharge sleeve could be removed and the main discharge control valve installed for regular service.

The object of the invention is to provide a combined valve assembly including a shut-off valve and flow valve in which the latter valve can be isolated from the fluid flow for maintenance and repair.

A further object of the invention is to provide means whereby the valve can be used as a free discharge valve assembly or as a shut-off valve.

A further object of the invention is to provide an oscillating valve member having two sealing seats and a movable sealing ring can engage with either one or other sealing seats.

A further object of the invention is to provide an oscillating valve sealable in two position settings and carrying a reciprocating main discharge flow control valve adapted to seat within the oscillating valve.

The above and other objects of the invention will be apparent from the following detailed specification and the accompanying drawings, in which:

FIG. 2 is a vertical section taken on the line 2—2 of FIG. 1 showing the oscillating shut-off valve seated in its open position and the flow control valve seated in its closed position against the oscillating valve.

FIG. 3 is a view similar to FIG. 2 but to a smaller scale and showing the oscillating shut-off valve rotated and seated in its closed position, with the flow control valve open and aligned with the access opening of the valve casing in position for maintenance.

FIG. 4 is a view similar to FIG. 3 but showing a removable sleeve installed as a free discharge valve in place of the flow control valve.

Figures 1, 5, 6:
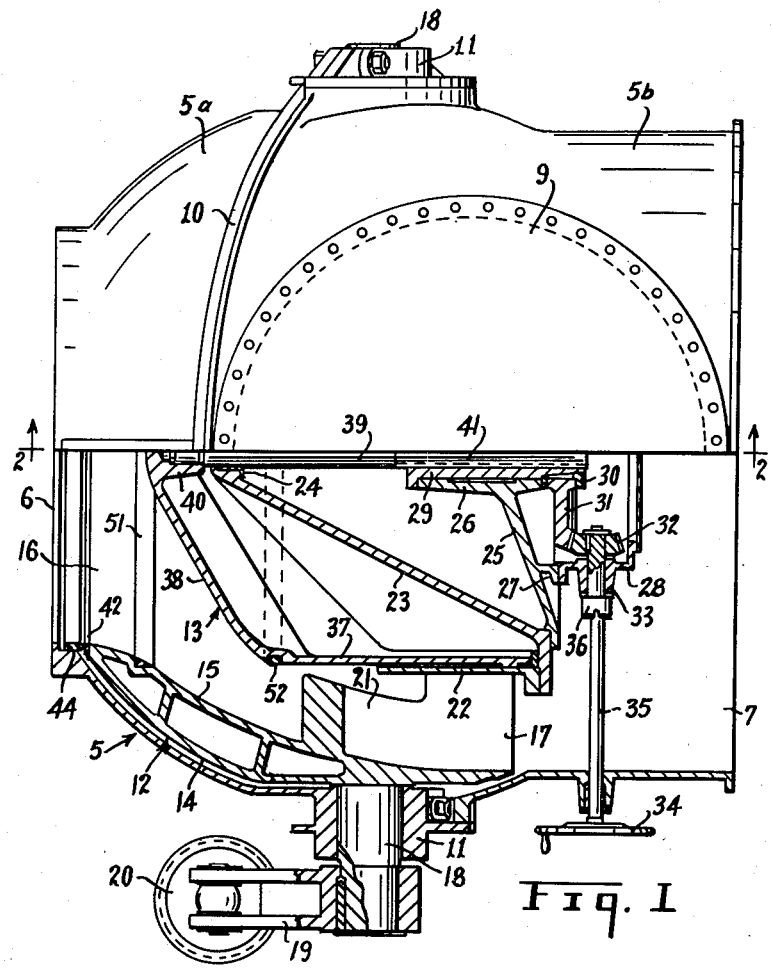
FIG. 1 is a plan view of the combined shut-off ventilated jet discharge valve assembly, partly in section and showing the oscillating shut-off valve seated in its open position and the flow control valve also in its open position.
FIG. 5 is an enlarged sectional view showing the cam means for reciprocating the movable sealing ring into and out of seating engagement with either of the sealing rings of the oscillating shut-off valve.
FIG. 6 is a partial plan view taken on the line 6—6 of FIG. 5.

Referring to the drawings, the valve casing 5 is preferably made in sections, the inlet section 5a and the discharge section 5b. Both sections 5a and 5b may also be made in sections and be joined together by the flanges 5c and 5d. The inlet section 5a of the valve casing is preferably hemispherical in shape and has the inlet port 6, while the discharge section 5b is partly cylindrical in shape and has the discharge port 7 and the and the access opening 8, the access opening being normally closed by the cover plate 9. The joining flanges 10 joining the two sections 5a and 5b together are disposed at an angle to the axis of the inlet and discharge ports 6 and 7 of the casing and pass through the horizontal rotative axis of the valve. Trunnion bearings 11 are formed half in the section 5a and half in the section 5b at the joining flanges 10.

The combined valve assembly consists of an oscillating shut-off valve 12 and a main discharge flow control valve 13. The oscillating valve 12 is in the form of a spherical zone having an outer surface 14 and an inner surface 15 and is provided with an inlet opening 16 equal in diameter to the inlet port 6 of the casing 5 and a discharge opening 17 equal in diameter to the discharge port 7 of the casing 5. A pair of trunnions 18 project outwardly from the outer surface 14 of the oscillating valve 12 and seat in the trunnion bearings 11 of the casing 5. A lever 19 connected to one of the trunnions 18 is operated by the cylinder and piston device 20 to rotate the combined oscillating valve 12 and main discharge flow control valve 13 through a travel of approximately 75°. A spider 21 projects inwardly from the inner surface 15 of the oscillating valve 12 and supports the sleeve 22 disposed about the axis passing through the inlet and discharge openings 16 and 17 of the oscillating valve 12.

The sleeve 22 supports the conical bearing member 23 having a bearing 24 at its apex. The bearing member 23 in turn supports the member 25 carrying the bearing sleeve 26 disposed about the same axis as the bearing 24 and is provided with an annular flange 27 which in turn supports the bevel gear casing 28. A threaded sleeve 29 is supported within the sleeve 26 and is held captive therein by the nut 30.

A bevel gear 31 is keyed to the threaded sleeve 29 and is rotated by the bevel pinion 32 mounted on the shaft 33 passing through the gear casing 28. The shaft 33 is rotated by means of the hand wheel 34 and shaft 35. The shafts 33 and 35 can be uncoupled from each other by means of the coupling nut 36.

The main discharge flow control valve 13 is in the form of dished plug having a cylindrical body portion 37 and a conical end wall 38. The cylindrical body portion 37 of the valve 13 is adapted to reciprocate within the sleeve 22 of the spider 21, and is held against rotation in the sleeve 22 by means of the key 37a sliding in the slot 22a. A shaft 39 is secured at one end in the boss 40 in the end wall 38 of the valve 13 and has its opposite end threaded at 41 for threading engagement within the threaded sleeve 29.

In order to provide sealing between the oscillating valve 12 and the casing 5 in both the open and closed positions of the oscillating valve relative to the inlet port 6 of the casing, the oscillating valve is provided with two sealing rings. One annular open seal ring 42 is secured about the inlet opening 16 of the valve and the other annular closed seal ring 43 is secured on the outer face 14 of the valve 12 and is centered on the vertical axis of the valve at a position approximately 75° from the axis of the inlet opening 16. A movable sealing ring 44 is seated in a recess 45 in the wall of the inlet port 6 of the casing 5 and is movable axially therein to bring it into and out of contact with either of the sealing rings 42 and 43 of the oscillating valve 12. The sealing ring 44 is shown in FIGS. 5 and 6 as having a tapered sealing edge 46 and is moved from one position to another by means of the eccentric cam 47 located within the aperture 48 on the ring 44. The cam 47 is on the end of the shaft 49 which projects through to the outside of the casing 5 and is secured in the adjusted position of the cam 47 by the lock nut 50.

A sealing ring 51 is seated on the inner surface 15 of the oscillating valve 12 slightly inwards of its inlet opening 16. A corresponding sealing ring 52 is seated in the main discharge control valve 13 at the junction between its cylindrical body portion 37 and its end wall 38 so that, when the valve 13 is moved axially into the position shown in FIG. 2, the sealing ring 52 will engage in sealing contact with the seal ring 51 to effectively seal off the inlet opening 16 of the oscillating valve 12 and the inlet port 6 of the casing 5.

Under certain circumstances, such as during the construction and installation of hydro-electric plants, it may be desirable that there should be a free discharge of water through the penstock and valve casing before the flow control valve 13 is installed in the oscillating shut-off valve 12. The present invention lends itself to such a temporary installation as is illustrated in FIG. 4 of the drawings. In the temporary assembly illustrated in FIG. 4, the cylindrical sleeve 60 takes the place of the normal flow control valve 13 and is mounted on the sleeve 22 of the shut-off valve 12 by means of the flange 61 secured about the outer surface of the cylindrical sleeve 60. The end of the cylindrical sleeve 60 remote from the flange 61, is provided with a seal ring 62 which engages with the seal ring 51 of the oscillating shut-off valve 12 in the same manner as does the seal ring 52 of the flow control valve 13 as illustrated in FIG. 2.

With the cylindrical sleeve 60 installed in the oscillating shut-off valve 12, the valve 12 can be rotated into the position shown in FIGS. 1 and 2 to provide a free discharge passage through the cylindrical sleeve 60. When it is convenient or desirable to install the flow control valve 13 in the assembly, the shut-off valve 12 is rotated into the position shown in FIG. 4 and sealed as shown in FIG. 5. The cylindrical sleeve 60 can then be removed from the oscillating shut-off valve 12 and be replaced by the flow control valve 13 under dry conditions.

In the operation of this invention, after the valve assembly has been installed in the discharge pipe line, the valve can be utilized as follows:

(a) As a controlled discharge valve with the valve 13 in the full open position as shown in FIG. 1 or in any intermediate position between full open and full closed position as shown in FIG. 2.

(b) As a plug to the inlet sealing off the pipe line as shown in FIG. 3 to permit access to the main discharge flow control valve 13 for maintenance and even for withdrawal of the control valve for repair or replacement.

(c) As a free discharge valve as shown in FIG. 4 in which the main discharge flow control valve is removed and replaced by an open ended cylinder.

In the operation of the valve as a control valve, the oscillating valve 12 and the discharge flow control valve 13 are rotated as a unit into the position shown in both FIGURES 1 and 2 where the axis of the valves coincide with the axis of the inlet and outlet ports 6 and 7 of the valve casing. If the ocillating valve is first in the position shown in FIGURE 3, the sealing ring 44 must first be withdrawn from contact with the closed seal ring 43 by rotating the cam 48 and withdrawing the seal ring 44 to permit the oscillating valve 12 to be rotated by means of the cylinder and piston device 20. When the oscillating and flow control valves 12 and 13 have been rotated into the open position, the seal ring 44 is moved forward into sealing engagement with the open seal ring 42. In this position, the discharge through the valve can be controlled by the main discharge flow control valve 13 by adjusting the axial position of the valve 13 by means of the handle 34 and bevel gearing 31–32 rotating the sleeve 29 and advancing and retracting the shaft 39.

Should it be necessary to do maintenance repairs or even replace the flow control valve 13, the control valve is retracted into the open position, the seal ring 44 is withdrawn from contact with the open seal ring 42 and the whole valve assembly is rotated into the position shown in FIGURE 3. The seal ring 44 is then moved forward into contact with the closed seal ring 43. In this position the inlet port 6 of the valve casing is effectively closed off and, after the cover 9 of the casing is removed ample access space allows the flow control valve to be dismantled and the valve can be hoisted up through the access opening 8.

The substitution of the free flow cylinder 60 for the control valve 13 or vice versa can be carried out with complete safety when the pipe line is sealed off by the oscillating valve 12.

By the use of the above described combination valve assembly the use of separate isolating valves upstream from the discharge valve, is eliminated together with the cost of such a valve and the excavation and installation that go with it.

The embodiments of the invention in which an exclusive property or privilege is claimed are defined as follows:

1. A valve assembly comprising a hollow valve casing having axially aligned inlet and outlet openings and an access opening located intermediate said inlet and outlet openings, an oscillating shut-off valve mounted in said casing and having inlet and outlet openings at opposite ends of a flow passage extending through said valve, said shut-off valve being mounted for oscillation from a position in which the inlet and outlet openings of the valve are aligned with the inlet and outlet openings of the valve casing to a position in which the valve inlet and outlet openings and flow passage are aligned with said access openings and in which the inlet opening of the valve casing is closed or blocked off by a portion of the shut-off valve, a flow control valve removably mounted in the shut-off valve for controlling the flow through the shut-off valve, means for moving the flow control valve to and from a valve seat carried by said shut-off valve said flow control valve being insertable in and removable from the shut-off valve when the latter is positioned with its inlet and outlet openings and flow passage aligned with the access opening of the valve casing, and a removable cover normally closing said access opening.

2. A valve assembly as set forth in claim 1 in which the flow control valve is in the form of a dished member having a cylindrical portion and a partly conical end wall at one end of the dished portion and a threaded shaft is mounted at one end in the said end wall and extends axially through said cylindrical portion.

3. A valve assembly as set forth in claim 2 in which the flow control valve has an annular sealing ring seated in the outer surface of said valve approximately at the junction of said cylindrical portion and the conical end wall.

4. A valve assembly as set forth in claim 1, in which the oscillating shut-off valve has a pair of valve seats on its outer surface, one of said valve seats being located axially about the inlet opening of the shut-off valve and the other being located on a blank portion of the shut-off valve intermediate its inlet and outlet openings.

5. A valve assembly as set forth in claim 1, in which the said valve casing has a sealing ring located axially in the inlet opening of the valve casing for sealing engagement with the said shut-off valve in both operative positions of the shut-off valve.

6. A valve assembly as set forth in claim 4, in which the said valve casing has a sealing ring located axially in the inlet opening of the valve casing and is movable axially to bring it into and out of contact with one or other of said pair of valve seats.

7. A valve assembly as set forth in claim 6, in which the said sealing ring is movable axially by a cam operable from outside the valve casing.

8. A valve assembly as set forth in claim 1, in which the shut-off valve is provided with a spider axially located in the flow passage and the flow control valve is mounted in the spider for axial reciprocation therein.

9. A valve assembly as set forth in claim 8, in which the flow control valve is reciprocated by a gear drive operable from the outside of the valve casing.

10. A valve assembly as set forth in claim 9, in which the operable means for the gear drive is disengaged from the gear drive when the shut-off valve is aligned with the access opening in the valve casing to permit withdrawal of the flow control valve.

11. A valve assembly comprising a hollow valve casing having axially aligned inlet and outlet openings and an access opening located intermediate said inlet and outlet openings, an oscillating shut-off valve mounted in said casing and having inlet and outlet openings at opposite ends of a flow passage extending through said valve, said shut-off valve being mounted for oscillation from a position in which the inlet and outlet openings of the valve are aligned with the inlet and outlet openings of the valve casing to a position in which the valve inlet and outlet openings and flow passage are aligned with said access opening and in which the inlet opening of the valve casing is closed or blocked off by a portion of the shut-off valve, means to oscillate said shut-off valve from the outside of said valve casing, a spider located within the flow passage of said shut-off valve, a flow control valve removably mounted in said spider for controlling the flow through said shut-off valve, means for moving the flow control valve axially in said spider to and from a valve seat carried by said shut-off valve, said flow control valve being insertable in and removable from the shut-off valve when the latter is positioned with its inlet and outlet openings and flow passage aligned with the access opening of the valve casing, and a removable cover normally closing said access opening.

12. A valve assembly as set forth in claim 11, in which the said spider includes an annular sleeve within which the said flow control valve is reciprocated from an open to a closed position with respect to the shut-off valve.

13. A valve assembly as set forth in claim 12, in which the annular sleeve supports a bearing member and a gear drive and a threaded shaft connects said gear drive with the flow control valve for reciprocation of the flow control valve into and out of sealing engagement with the shut-off valve.

References Cited in the file of this patent

UNITED STATES PATENTS

| | | |
|---|---|---|
| 1,841,224 | Thomson | Jan. 12, 1932 |
| 1,933,903 | Hamer | Nov. 7, 1933 |
| 2,124,359 | Weisgerber | July 19, 1938 |
| 2,186,481 | Fleming | Jan. 9, 1940 |
| 2,642,890 | Skewis | June 23, 1953 |
| 2,863,629 | Knox | Dec. 9, 1958 |

FOREIGN PATENTS

| | | |
|---|---|---|
| 748,888 | Great Britain | May 16, 1956 |